United States Patent
Tsyganskiy et al.

(10) Patent No.: US 10,032,134 B2
(45) Date of Patent: Jul. 24, 2018

(54) AUTOMATED DECISION MAKING

(71) Applicants: Boris Tsyganskiy, Los Altos, CA (US); Peter Spielvogel, Sunnyvale, CA (US)

(72) Inventors: Boris Tsyganskiy, Los Altos, CA (US); Peter Spielvogel, Sunnyvale, CA (US)

(73) Assignee: SAP SE, Walldorf (DE)

( * ) Notice: Subject to any disclaimer, the term of this patent is extended or adjusted under 35 U.S.C. 154(b) by 621 days.

(21) Appl. No.: 14/505,025

(22) Filed: Oct. 2, 2014

(65) Prior Publication Data

US 2016/0098682 A1 Apr. 7, 2016

(51) Int. Cl.
*G06Q 10/10* (2012.01)

(52) U.S. Cl.
CPC .................. *G06Q 10/105* (2013.01)

(58) Field of Classification Search
CPC ......... G06Q 10/105; G06N 5/00; G06N 5/025
USPC ........................................................ 706/45
See application file for complete search history.

(56) References Cited

U.S. PATENT DOCUMENTS

| | | | |
|---|---|---|---|
| 6,286,030 B1 | 9/2001 | Wenig et al. | |
| 6,286,098 B1 | 9/2001 | Wenig et al. | |
| 6,442,682 B1* | 8/2002 | Pothapragada | ... G06F 17/30067 707/E17.01 |
| 7,412,626 B2 | 8/2008 | Wood et al. | |
| 7,536,315 B2 | 5/2009 | Tsyganskiy et al. | |
| 7,542,980 B2 | 6/2009 | Tsyganskiy et al. | |
| 7,543,175 B2 | 6/2009 | Wood et al. | |
| 7,702,638 B2 | 4/2010 | Tsyganskiy et al. | |
| 7,720,879 B2 | 5/2010 | Tsyganskiy et al. | |
| RE41,903 E | 10/2010 | Wenig et al. | |
| 7,941,463 B2 | 5/2011 | Tsyganskiy et al. | |
| 7,949,765 B2 | 5/2011 | Tsyganskiy | |
| 7,958,486 B2 | 6/2011 | Tsyganskiy et al. | |
| 8,402,433 B2 | 3/2013 | Wood et al. | |
| 8,539,003 B2 | 9/2013 | Tsyganskiy et al. | |
| 2003/0189600 A1* | 10/2003 | Gune | ................. G06Q 10/0631 715/810 |
| 2009/0119241 A1* | 5/2009 | Fano | ...................... G06N 5/025 706/47 |
| 2009/0320088 A1* | 12/2009 | Gill | ....................... G06F 21/604 726/1 |
| 2014/0222494 A1* | 8/2014 | Leitch | ................ G06Q 10/0633 705/7.26 |

* cited by examiner

*Primary Examiner* — Dave Misir
(74) *Attorney, Agent, or Firm* — Fish & Richardson P.C.

(57) ABSTRACT

The present disclosure involves systems, software, and computer implemented methods for decision making. One example method includes receiving a request for a decision at a decision manager system, the received request associated with a unique identifier, classifying the request based on metadata associated with the received request, identifying a decision approval rule set based on the classified request, the decision approval rule set identifying a set of approvers, identifying at least one prior approval associated with the unique identifier, the at least one prior approval associated with the at least one approver, and applying the at least one prior approval to the decision associated with the received request and updating the set of approvers by removing the at least one approver from the set of approvers.

19 Claims, 5 Drawing Sheets

| | | |
|---|---|---|
| CLASSIFICATION | HUMAN RESOURCES | ⟵502 |
| SUB-CLASSIFICATION | HIRING INDIVIDUAL CONTRIBUTOR EMPLOYEE | ⟵504 |
| 1 REQUESTER | JOHN SMITH | ⟵506 |
| 2 REQUESTER'S FIRST LEVEL MANAGER | SALLY JONES | ⟵508 |
| 3 HUMAN RESOURCES BUSINESS PARTNER | STEVE GARCIA | ⟵510 |
| 4 REQUESTER'S SECOND LEVEL MANAGER | MIKE LEE | ⟵512 |
| 5 HR DIRECTOR | ASHLEY WILSON | ⟵514 |
| 6 BUSINESS UNIT MANAGER | MARY JOHNSON | ⟵516 |

FIG. 5

AUTOMATED DECISION MAKING

TECHNICAL FIELD

The present disclosure relates to computer-implemented methods, software, and systems for decision making.

BACKGROUND

Many organizations use a hierarchical management structure. For example, a group of non-manager employees may be managed by a first-line manager. A group of first-line managers may be managed by a second-line manager, etc. An employee at a given level may send a decision request to his/her manager and possibly other persons. The decision request can be, for example, for an expenditure. The decision request can, for example, be denied, approved, or forwarded to other approvers.

SUMMARY

The present disclosure involves systems, software, and computer implemented methods for making decisions. One example method includes receiving a request for a decision at a decision manager system, the received request associated with a unique identifier, classifying the request based on metadata associated with the received request, identifying a decision approval rule set based on the classified request, the decision approval rule set identifying a set of approvers, identifying at least one prior approval associated with the unique identifier, the at least one prior approval associated with the at least one approver, and applying the at least one prior approval to the decision associated with the received request and updating the set of approvers by removing the at least one approver from the set of approvers.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Decision making in large organizations can consume considerable time, especially if a decision requires input from many people distributed across many departments. Routing approval requests and following up with approvers can be time consuming. In the course of a year, certain people may encounter the same types of decisions or approvals multiple times. Approval requests can be repeated for a same approver for a decision, such as when an approver does not provide an approval or sends a request back upstream to ask for additional information. As another example, an approver may provide an approval for an approval request that is sent from a first system or as part of a first approval process but may be sent a second approval request for the same decision from a second system or process, even though the approver already approved the decision. For example, the first process may be a pre-planning process and the second process may be a more formal planning process. Automating decision-making processes including requesting approvals of the right people at the right time and only when approvals have not already been supplied can significantly reduce the time it takes to make decisions as well as the amount of resources consumed in reaching a decision. For example, unnecessary duplication of effort in decision-making processes can be reduced. Automated decision-making tools can be integrated into other systems, such as an ERP (Enterprise Resource Planning) system. Such integration can result in streamlined decision making which can provide a competitive advantage to both users and sellers of the integrated offering.

Figure 1:
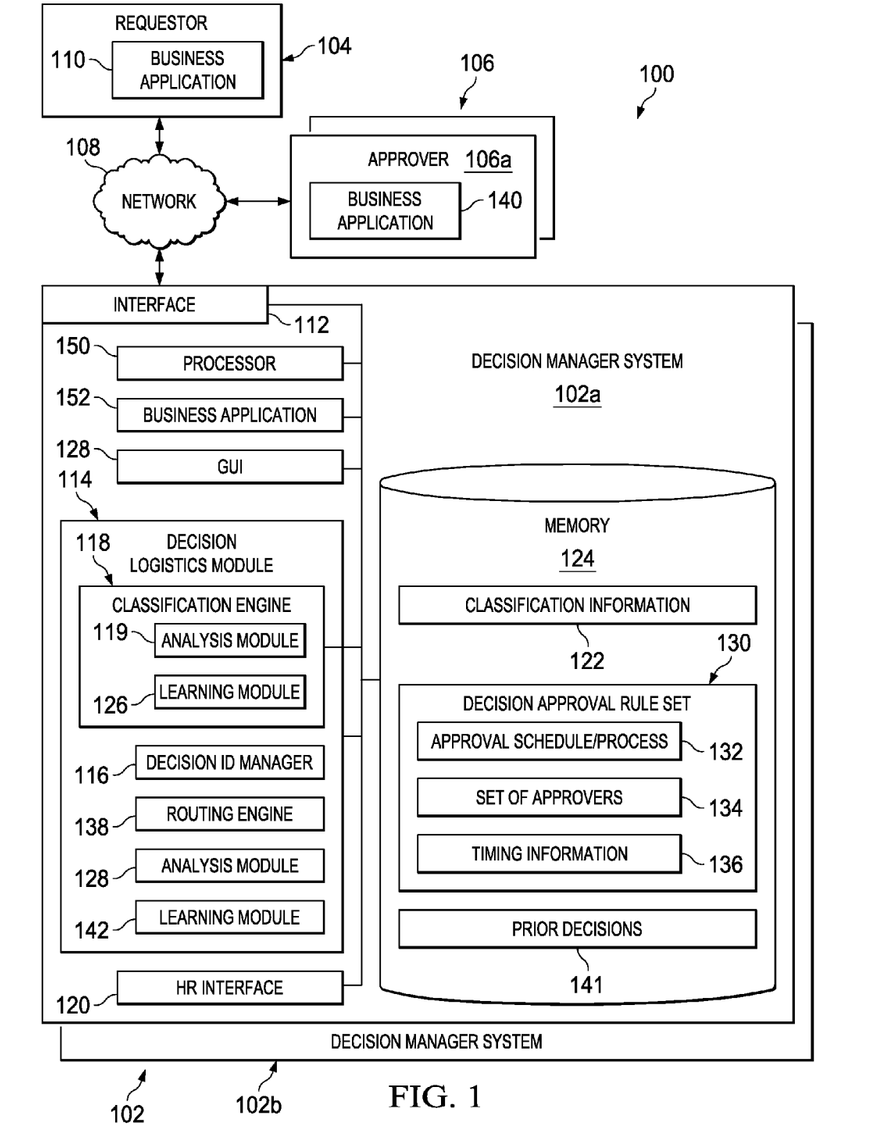
FIG. 1 is a block diagram illustrating an example system for decision making.

FIG. 1 is a block diagram illustrating an example system 100 for decision making Specifically, the illustrated system 100 includes or is communicably coupled with one or more decision manager systems 102 (including a decision manager system 102a and a second decision manager system 102b), a requestor device 104, one or more approver devices 106 (including an approver device 106a), and a network 108. The decision manager systems 102 can be, for example, business systems or any other type of system in which decisions are made. Although shown separately, in some implementations, functionality of two or more systems or servers may be provided by a single system or server. In some implementations, the functionality of one illustrated system or server may be provided by multiple systems or servers.

A user of the requestor device 104 can use a business application 110 to submit a request for a decision (e.g., a "decision request") to the decision management system 102a. The decision request can include metadata, such as a name and/or other identifying information of the user, a title or subject, a description, a deadline, or other information. The decision management system 102a can receive the decision request using an interface 112.

The decision request can be processed by a decision logistics module 114. As described in more detail below, a decision identifier ("ID") module 116 can determine whether the decision request is a new request or refers to or is otherwise associated with a prior decision request. The decision ID module 116 can generate a new identifier for the decision request or associate the decision request with a prior, related request.

A classification engine 118 can classify the decision request. For example, an analysis module 119 of the classification engine 118 can analyze metadata associated with the decision request to determine a class and possibly one or more sub-classes associated with the decision request. For example, the classification engine 118 can determine whether the decision request is for a hiring, a capital request, an operating budget, an outsourcing proposal, or for some other type of decision. In some implementations, the classification engine 118 can interface with one or more other systems. For example, the classification engine 118 can interface with a human resources (HR) system (e.g., using an HR interface 120), such as to determine a role or job title and an organization (e.g., department) associated with the requestor, a first-line manager of the requestor, or a second-line manager of the requestor, to name a few examples.

The analysis engine 119 can determine a classification based on one or more of keyword(s) included in the title and/or subject of the decision request, a job title of the requestor, a position of the requestor within the organizational structure used by the requestor's organization, past decision requests made by the requestor, the timing of the request (e.g., some requests may occur at a same time of year or a same time of month), and/or on decision requests made by other requestors (e.g., other requestors in a same department or with a same job role or title). The analysis engine 119 can evaluate one or more classification rules. The classification rules and classification information about prior classifications can be retrieved from stored classification information 122 in memory 124 of the decision management system 102*a*.

The classification engine 118 can determine a certainty value which represents a certainty that a determined classification matches the decision request. When the certainty is greater than a first threshold (e.g., 85%), the classification engine 118 can automatically classify the decision request. When the certainty is less than the first threshold but greater than a second threshold (e.g., 50%), the classification engine 118 can recommend a classification for the decision request and send a request to the requestor device 104 requesting that the requestor confirm the recommended classification. When the certainty is less than the second threshold, the classification engine 118 can send a request to the requestor device 104 requesting that the requestor manually classify the decision request.

The determined classification can be stored in the stored classification information 122. A learning module 126 of the classification engine 118 can analyze the determined classification along with other stored classification information and can adjust (e.g., improve) a classification algorithm used by the analysis module 119 based on the analysis, for improving classification of future decision requests. Accordingly, the classification of decision requests can be performed more accurately, with more certainty, as the number of classifications performed by the classification engine 118 increases over time. As mentioned, the stored classification information 122 can include a set of classification rules. An initial set of classification rules can be provided by, for example, by an administrator, using, for example, a GUI (Graphical User Interface) 128 of the decision management system 102*a*. The learning module 126 can add to and adjust the stored classification rules.

An analysis module 128 of the decision logistics module 114 can identify a decision approval rule set 130 for the decision request based on the classification determined by the classification engine 118. The decision approval rule set 130 can be identified based on a classification (and possibly one or more sub-classifications). The decision approval rule set 130 can reflect the current organizational structure and policies of the organization. The identified decision approval rule set 130 can be identified from among multiple defined decision approval rule sets. The memory 124 can include, for example, a decision approval rule set 130 for each of multiple classification and sub-classification combinations.

The identified decision approval rule set 130 can describe a schedule and routing of approvals used for the decision request. For example, the decision approval rule set 130 can include an approval schedule/process 132 and a set of approvers 134. The set of approvers 134 identifies individuals who are to provide input for the decision represented by the decision request. The set of approvers 134 can include, for example, one or more initial approvers (e.g., approver(s) to which the decision request is first sent), one or more intermediate approvers (e.g., approver(s) to which the decision request is sent after an initial approval is received), and one or more final approvers (e.g., approver(s) who make a final decision regarding the decision request).

The approval schedule/process 132 can define the routing of requests to the approvers in the set of approvers 134. The approval schedule/process 132 can define a sequential ordering of approvers in the set of approvers 134 or can define a more complicated approval process, with possibilities for branching, iterations, and back and forth communications between approvers. The approval schedule/process 132 can define actions to perform when a particular approver either approves or rejects the decision request. The approval schedule/process 132 can define a final approver who is to make a final decision for the decision request. The approval schedule/process 132 can refer to timing information 136, which can indicate, for example, how long to wait for an approver to submit a request before sending a reminder, escalating to a supervisor, or forwarding the request to a backup approver, etc. The approval schedule/process 132 can define backup approvers to use, for example, if a particular approver is on vacation or otherwise not available.

An administrator can, via the GUI 128, define an initial decision approval rule set 130 for a classification, including the approval schedule/process 132, the set of approvers 134, and the timing information 136. An administrator can modify the decision approval rule set 130 as needed. As described in more detail below, the decision approval rule set 130 can be automatically changed over time.

A routing engine 138 is configured to apply the identified approval rule set 130, including routing the decision request to the set of approvers 134 according to the approval schedule/process 132. The decision request can be sent to respective approver devices 106, including the approver device 106*a*. For example, the decision request can be presented in a business application 140 executing on the approver device 106*a*. The approver associated with the approver device 106*a* can use the business application 140 to respond to the decision request.

The routing engine 138 and the approval schedule/process 132 can be configured such that an initial response for the decision request is requested of an approver in the set of approvers 134 with no other requests being made of the approver unless the approver needs to approve a change to the decision request or negotiate with other approvers in the set of approvers 134. That is, at each stage of the approval schedule/process 132, the routing engine 138 can send a next approval request to only the approvers who need to make a decision at that stage of the approval process. An approval request is not sent to an approver who has already approved (based on known and associated prior responses), unless a condition is identified for which a re-approval is needed. In some implementations, the routing engine 138 maintains a current set of approvers who are to be sent the decision request. As approvers approve the decision request, they are removed from the current set of approvers.

The approval schedule/process 132 can define rules for when a prior approval of an approver is or is no longer valid for the approval schedule/process 132. For example, a rule can specify that when an approver has approved a certain amount or quantity of an item (e.g., a certain budget amount or a certain number of items to purchase, such as computer servers), that the approval remains valid even when the decision request is adjusted (e.g., by a subsequent approver) to be for a lesser amount or quantity. For example, an approval of a first approver who approves six computer servers can remain valid if a second approver approves only four computer servers.

The routing engine 138 can receive responses from each of the approvers in the set of approvers 134, including receiving a response from the final approver. The response from the final approver can be an outcome of the decision request. The outcome can be provided to the requestor device 104, such as for presentation in the business application 110.

Information regarding the processing of the approval schedule/process 132 for the decision request, including the outcome, can be stored in a prior decisions data store 141. A learning module 142 of the decision logistics module 114 can analyze the information in the prior decisions data store 141 and can adjust (e.g., improve) the approval schedule/process 132 for the class of the decision request based on the analysis, for improving processing of future decision requests. Accordingly, the processing of future decision requests can be performed more efficiently, as the number of decision requests processed by the decision logistics module 114 increases over time. For example, a decision request may first be processed by routing the decision request to multiple approvers, including a legal approver who is sent the decision request near (or at) the end of the approval schedule/process 132. Suppose the legal approver rejects the decision request because the requested project cannot be performed in a requested location due to local laws. The learning module 142 can learn from the outcome and can adjust the approval schedule/process 132 to include the legal approver at (or near) the beginning of the approval schedule/process 132. In general, the learning module 142 can adjust the decision approval rule set 130, including the approval schedule/process 132, the set of approvers 134, and the timing information 136 based on the processing of past decisions.

As mentioned, the system 100 can include multiple decision management systems 102. As described in more detail below, a second decision request can be sent to (or initiated at) the second decision management system 102b in response to the determination of the outcome of the first decision request. Multiple decision management systems 102 can be linked. For example, a prior approval from the decision manager system 102a can be used in the second decision manager system 102b (e.g., the approver who provided the prior approval to the decision management system 102a may not need to provide a re-approval to the second decision management system 102b). For example, the first decision may be performed at a first level in an organization, such as by a particular technology group. The second decision could be performed at a second level, such as by a procurement group. At least some of the approvals/decisions at the first level may be relevant to the approvals/decisions at the second level. The present solution allows the prior decisions that are relevant to be automatically applied to later decisions, avoiding unnecessary requests for approvals and decisions when such approvals and decisions have already been provided at an earlier time.

As used in the present disclosure, the term "computer" is intended to encompass any suitable processing device. For example, although FIG. 1 illustrates one or more decision manager systems 102, a single requestor device 104, and one or more approver devices 106, the system 100 can be implemented, for example, using one or more of a single, stand-alone computing device, one decision manager system 102, or two or more requestor devices 104. Indeed, the decision manager system(s) 102, the requestor device 104, and the approver device(s) 106 may each be any computer or processing device such as, for example, a blade server, general-purpose personal computer (PC), Mac®, workstation, UNIX-based workstation, tablet computer, smartphone, or any other suitable device. In other words, the present disclosure contemplates computers other than general purpose computers, as well as computers without conventional operating systems. Further, the decision manager system(s) 102, the requestor device 104, and the approver device(s) 106 may each may be adapted to execute any operating system, including Linux, UNIX, Windows, Mac OS®, Java™, Android™, iOS or any other suitable operating system. According to one implementation, the decision manager system(s) 102 may each also include or be communicably coupled with an e-mail server, a Web server, a caching server, a streaming data server, a human resources server, an ERP server, and/or other suitable server.

The interface 112, is used by the decision manager system 102a for communicating with other systems in a distributed environment—including within the system 100—connected to the network 108. Generally, the interface 112 comprises logic encoded in software and/or hardware in a suitable combination and operable to communicate with the network 108. More specifically, the interface 112 may comprise software supporting one or more communication protocols associated with communications such that the network 108 or interface's hardware is operable to communicate physical signals within and outside of the illustrated system 100. Although not illustrated, the requestor device 104 and the approver device 106a each include an interface which may be similar to the interface 112.

The decision manager system 102a includes one or more processors 150. Each processor 150 may be a central processing unit (CPU), a blade, an application specific integrated circuit (ASIC), a field-programmable gate array (FPGA), graphical processing unit (GPU), or another suitable component. Generally, each processor 150 executes instructions and manipulates data to perform the operations of the decision manager system 102a. Specifically, each processor 150 executes the functionality required to receive and respond to requests from the requestor device 104 and responses from the approver device 106a, for example.

The decision manager system 102a includes the memory 124. In some implementations, the decision manager system 102a includes multiple memories. The memory 124 may include any type of memory or database module and may take the form of volatile and/or non-volatile memory including, without limitation, magnetic media, optical media, random access memory (RAM), read-only memory (ROM), removable media, or any other suitable local or remote memory component. The memory 124 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the decision manager system 102a. Although not illustrated, the requestor device 104 and the approver device 106a each include memory which may be similar to the memory 124.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, C#, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The requestor device 104 and the approver device 106a may each generally be any computing device operable to connect to or communicate with the decision manager system(s) 102 via the network 108 using a wireline or wireless connection. In general, the requestor device 104 and the approver device 106a each comprise an electronic computer device operable to receive, transmit, process, and store any appropriate data associated with the system 100 of FIG. 1. The requestor device 104 and the approver device 106a can each include one or more client applications, including the business application 110 and the business application 140, respectively. A client application is any type of application that allows the requestor device 104 or the approver device 106a to request and view content on the respective device. In some implementations, a client application can use parameters, metadata, and other information received at launch to access a particular set of data from the decision manager system 102. In some instances, a client application may be an agent or client-side version of the one or more enterprise applications running on an enterprise server. In some implementations, the business application 110 and/or the business application 140 may be a client-side version of a business application 152 running on the decision manager system 102a.

Although not illustrated, the requestor device 104 and the approver device 106a each include one or more processors which may be similar to the one or more processors 150. Specifically, each processor included in the requestor device 104 or the approver device 106a can execute the functionality required to send requests to the decision manager system 102a and to receive and process responses from the decision manager system 102a.

The requestor device 104 and the approver device 106a are each generally intended to encompass any client computing device such as a laptop/notebook computer, wireless data port, smart phone, personal data assistant (PDA), tablet computing device, one or more processors within these devices, or any other suitable processing device. For example, the requestor device 104 and/or the approver device 106a may comprise a computer that includes an input device, such as a keypad, touch screen, or other device that can accept user information, and an output device that conveys information associated with the operation of the decision manager system 102a, or the respective client device itself, including digital data, visual information, or a graphical user interface (GUI).

A GUI of the requestor device 104 or the approver device 106a can interface with at least a portion of the system 100 for any suitable purpose, including generating a visual representation of the business application 110 or the business application 140, respectively. In particular, a GUI of the requestor device 104 or the approver device 106a may be used to view and navigate various Web pages. Generally, a GUI of the requestor device 104 or the approver device 106a provides a corresponding user with an efficient and user-friendly presentation of business data provided by or communicated within the system. The GUI may comprise a plurality of customizable frames or views having interactive fields, pull-down lists, and buttons operated by the user. The GUI contemplates any suitable graphical user interface, such as a combination of a generic web browser, intelligent engine, dashboard, and command line interface (CLI) that processes information and efficiently presents the results to the user visually.

There may be any number of requestor devices 104 and approver devices 106 associated with, or external to, the system 100. For example, while the illustrated system 100 includes one requestor device 104, alternative implementations of the system 100 may include multiple requestor devices 104 communicably coupled to the decision manager system 102a and/or the network 108, or any other number suitable to the purposes of the system 100. Additionally, there may also be one or more additional client devices external to the illustrated portion of system 100 that are capable of interacting with the system 100 via the network 108. Further, the term "client", "client device," and "user" may be used interchangeably as appropriate without departing from the scope of this disclosure. Moreover, while the requestor device 104 and the approver device 106a are each described in terms of being used by a single user, this disclosure contemplates that many users may use one computer, or that one user may use multiple computers.

Figure 2:
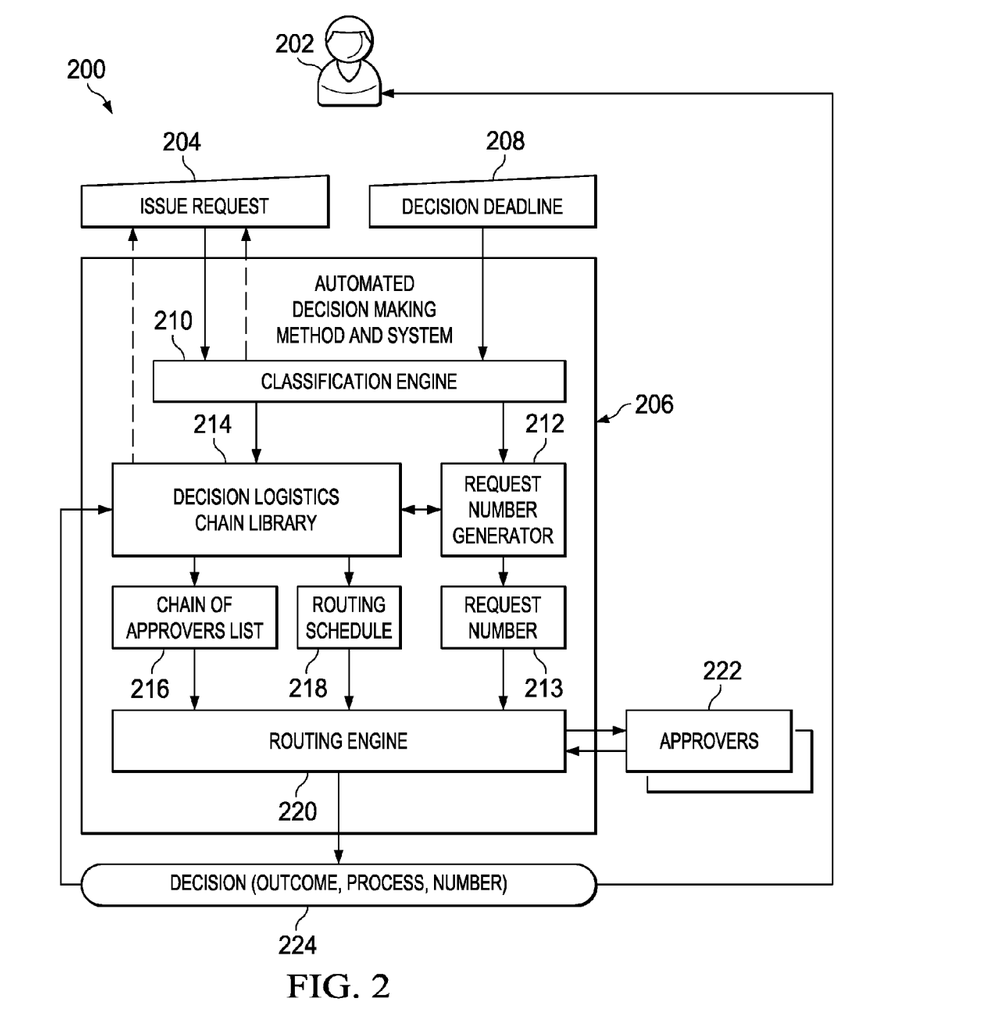
FIG. 2 is a block diagram illustrating components of an example system for decision making.

FIG. 2 is a block diagram illustrating components of an example system 200 for decision making A requestor 202 submits an issue request 204 to a decision management system 206. The requestor 202 can provide a decision deadline 208 when submitting the issue request 204. The requestor 202 can provide the issue request 204 and the decision deadline 208 using, for example, a user interface provided by the decision management system 206.

A classification engine 210 can determine classification information (e.g., a class and possibly one or more subclasses) for the issue request 204. For example, the classification engine 210 can automatically determine a type of decision associated with the issue request based on a predefined classification rule set and metadata associated with the issue request. For example, the classification engine 210 can determine classification information based on a role or organizational information (e.g., department) associated with the requestor 202, or on one or more keywords included in, for example, a title or description of the issue request 204.

A request number generator 212 can determine whether the issue request 204 is a new issue request or refers to an existing issue request. For example, the request number generator 212 can determine whether the issue request 204 includes an indication (e.g., an identifier) of a prior issue request. When the issue request 204 is a new issue request, the request number generator 212 can generate a unique identifier (e.g., a request number 213) for the issue request 204 and associate the unique identifier with the issue request 204.

A decision logistics chain library 214 can identify a set of approval rules, based on the classification determined by the classification engine 210. The approval rules can determine, for example, a chain of approvers list 216 associated with the issue request 204 and a routing schedule 218 including a timeframe for each approval step. A routing engine 220 can route the issue request 204 to a set of approvers 222 that correspond to the chain of approvers list 216, according to the routing schedule 218.

The routing engine 220 can receive responses from the set of approvers 222 for the issue request 204. The responses can include, for example, a response from a last approver included in the chain of approvers list 216. The response from the last approver can represent, for example, an outcome 224 (e.g., final decision, such as an approval, a rejection, or a modification) of the issue request 204. The outcome 224 can be provided to the requestor 202. The outcome 224 can also be provided to the decision logistics chain library 210, and the decision logistics chain library 210 can analyze the outcome 224 and may adjust a set of approval rules to improve handling of future issue requests.

Figure 3:
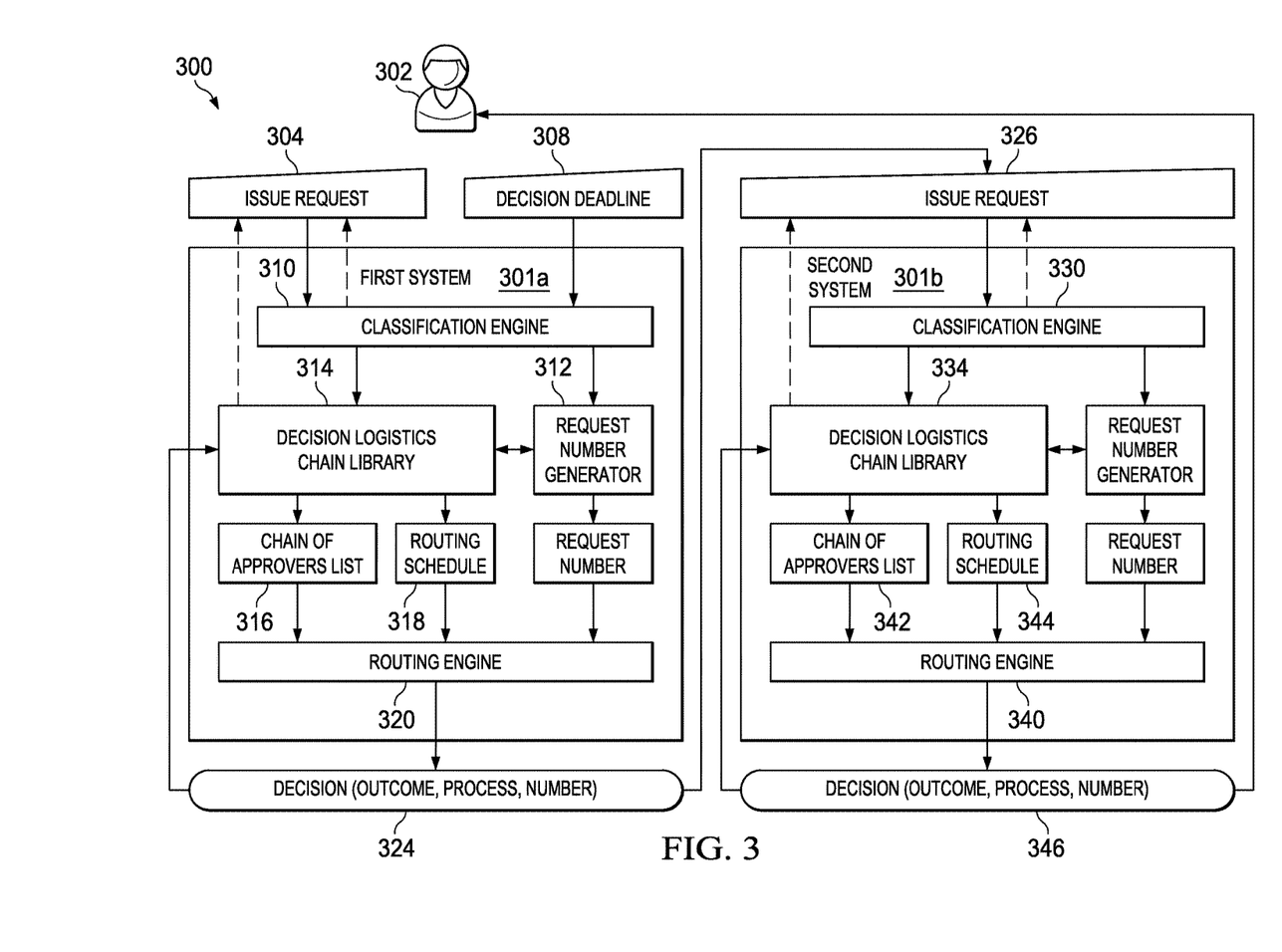
FIG. 3 is a block diagram illustrating an example system for routing a decision between a first decision management system and a second decision management system.

FIG. 3 is a block diagram illustrating an example system 300 for routing a decision between a first decision management system 301a and a second decision management system 301b. Similar to the above description for FIG. 2, a requestor 302 can submit an issue request 304 and a decision deadline 308 to the first decision management system 301a. A classification engine 310, a request number generator 312, a decision logistics chain library 314, and a routing engine 320 can perform the same respective, corresponding functions as the classification engine 210, the request number generator 212, the decision logistics chain library 214, and the routing engine 220. For example, the classification engine 310 can classify the request 304, the decision logistics chain library 314 can determine a chain of approvers list 316 and a routing schedule 318, and the routing engine 320 can route the issue request 304 to a set of approvers that correspond to the chain of approvers list 316, according to the routing schedule 318.

An outcome 324 for the issue request 304 can be determined and can be routed to the second decision management system 301b, which can be received by the second decision management system 301b as an issue request 326. In some implementations, the outcome 324 is provided to the decision logistics chain library 314, and the decision logistics chain library 314 can analyze the outcome 324 and may adjust a set of approval rules to improve handling of future issue requests. In some implementations and for some or all decisions, an indication of the outcome 324 can be provided to the requestor 302.

The second decision management system 301b includes components that are similar to components included in the first decision management system 301a, such as a classification engine 330, a decision logistics chain library 334, and a routing engine 340, which respectively correspond to the classification engine 310, the decision logistics chain library 314, and the routing engine 320.

The classification engine 330 can classify the issue request 326. In some implementations, the classification engine 330 identifies classification information determined by the classification engine 310 that is included in or otherwise associated with the issue request 326. In some implementations, the classification engine 330 determines a classification for the issue request 326, using a set of rules which may be different than a set of rules used by the classification engine 310.

The decision logistics chain library 334 can determine a chain of approvers list 342 and a routing schedule 344, using a set of rules which may be different than a set of rules used by the decision logistics chain library 314. The routing engine 340 can route the issue request 326 to a set of approvers that correspond to the chain of approvers list 342, according to the routing schedule 344.

The routing engine 340 can receive responses from the set of approvers for the issue request 326. The responses can include, for example, a response from a last approver included in the chain of approvers list 344. The response from the last approver can represent, for example, an outcome 346 (e.g., final decision, such as an approval, a rejection, or a modification) of the issue request 326. The outcome 346 can be provided to the requestor 302. The outcome 346 can also be provided to the decision logistics chain library 334, and the decision logistics chain library 334 can analyze the outcome 346 and may adjust a set of approval rules to improve handling of future issue requests.

Although two decision management systems are illustrated in FIG. 3, any number of decision management systems can be linked together. Although FIG. 3 illustrates the decision management system 301a and the decision management system 301b as having separate classification engines and decision logistics chain libraries, in some implementations, some or all linked decision management systems can share one or more components and/or information (e.g., classification and/or approval rules).

The system of FIG. 3 can be used, for example, when a decision involves pre-planning among a set of approvers followed by a more formal approval process. The pre-planning process can be modeled, for example, in the decision management system 301a. The routing schedule 318 can define, for example, pre-planning activities involving multiple approvers, such as approvers in controller, operations, and management departments. The decision 324 can represent an agreement among the approvers involved in the pre-planning process. As another example, a high-level strategy process can be modeled in the decision management system 301a, and the outcome 324 can represent an outcome (e.g., approval) of a high-level strategy prior to approval of specific tactical elements (e.g., modeled in the decision management system 301b) that can be performed by different departments. Each outcome 326 produced by the decision management system 301b can, for example, be subject to oversight by one or more approvers associated with the decision management system 301a.

The routing schedule 344 in the decision management system 301b can represent a more formal process performed by a particular system, such as a supplier relationship management (SRM) system. The chain of approvers list 342 can initially include, for example, some or all of the approvers in the controller, operations, and management departments, as well as approvers in other departments, such as purchasing, contracting, and legal departments. The decision management system 301b can determine that the issue request 326 is associated with the outcome 324 and can determine that some of the approvers in the chain of approvers list 342 have already approved the issue request 326 (e.g., the issue request 326 may include indications of prior approvals). The decision logistics chain library 334 can update the chain of approvers list 342 and the routing schedule 344 to reflect the prior approvals (e.g., removing approvers who made prior approvals from the chain of approvers list 342 and removing schedule items from the routing schedule 344 that are associated with the removed approvers).

Figure 4:
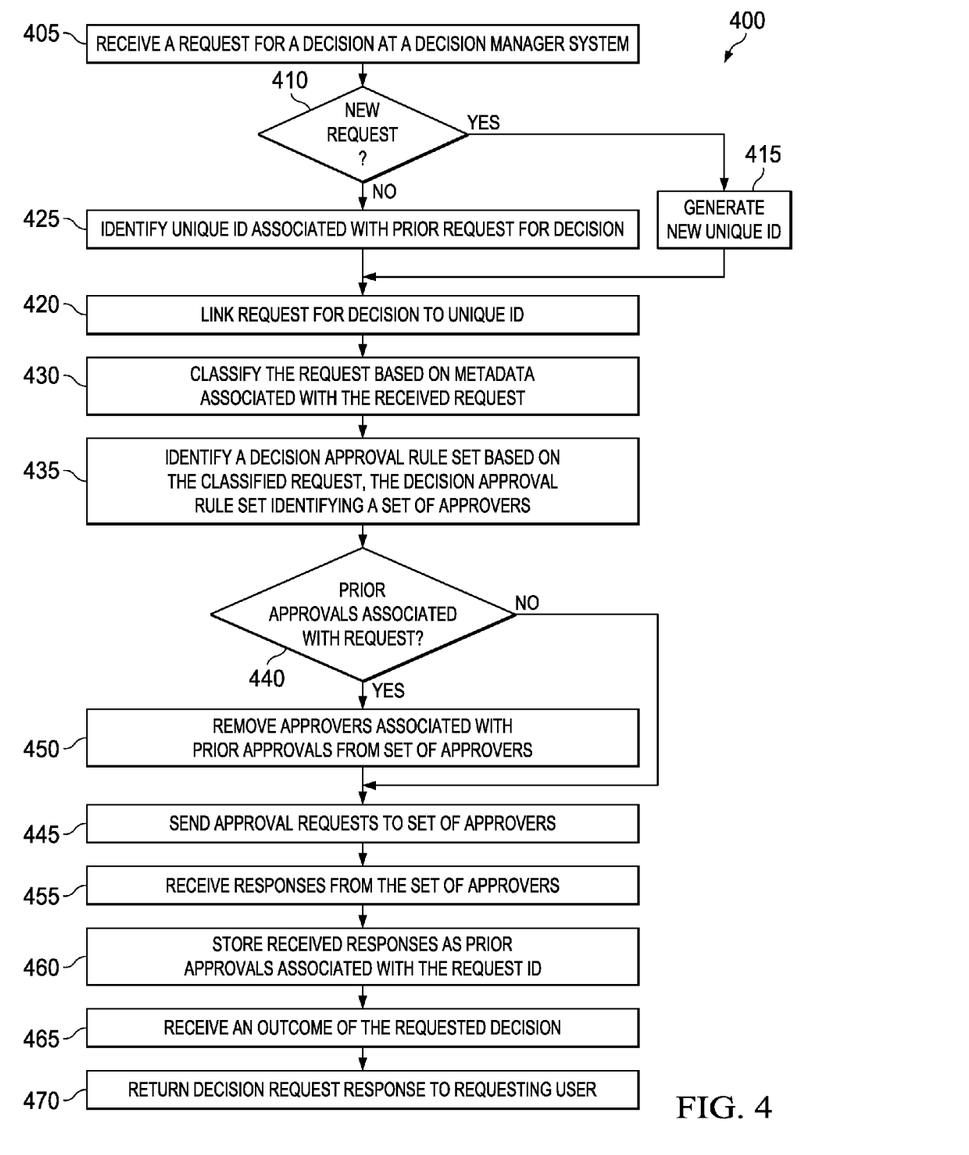
FIG. 4 is a flowchart of an example method for processing a request for a decision.

FIG. 4 is a flowchart of an example method 400 for processing a request for a decision. It will be understood that method 400 and related methods may be performed, for example, by any suitable system, environment, software, and hardware, or a combination of systems, environments, software, and hardware, as appropriate. For example, one or more of a client, a server, or other computing device can be used to execute method 400 and related methods and obtain any data from the memory of a client, the server, or the other computing device. In some implementations, the method 400 and related methods are executed by one or more components of the system 100 described above with respect to FIG. 1. For example, the method 400 and related methods can be executed by decision management system 102 of FIG. 1.

At 405, a request for a decision (e.g., decision request) is received at a decision manager system. The decision request can be associated with a decision deadline. The decision request can be received, for example, from a client device running a client application that is configured to interface with the decision manager system. A requestor user may, for example, use the client application to initiate the decision request and to provide information (e.g., a request description) associated with the decision request. As another example, the decision request can be manually entered (e.g., by an administrator) of the decision management system.

At 410, a determination is made as to whether the request for the decision is a new request or an existing (e.g., prior) request. For example, an identifier can be included in the decision request and a determination can be made as to whether the identifier is associated with a prior request. As another example, a determination can be made that the decision request has a same requestor, same title, and same deadline as a prior decision request. The timing of the decision request in relation to the timing of one or more prior decision requests and metadata associated with the decision request can also be analyzed to determine whether the request for the decision is a new request or a prior request. For example, an employee may request a new personal computer at a first point in time and may re-request the personal computer one week later if no response is received for the first request. The second request can be identified as being a same request as the first request due to the second request occurring a short time after an identical, as yet unfulfilled prior request. As another example, two employees in a same department may request a budget for a project with a same name and amount (e.g., five thousand dollars for a marketing video). The requests from the two employees can be identified as being duplicate requests.

When the request for the decision is a new request, a new unique identifier (ID) is generated, at 415. At 420, the request for the decision is linked to the new unique ID.

When the request for the decision is not a new request, a unique ID associated with a prior request for a decision is identified, at 425. At 420, the request for the decision is linked to the identified unique ID.

At 430, the request is classified based on metadata associated with the received request. For example, a classification can automatically be based on a pre-defined classification rule set and metadata associated with the decision request. For example, classification information can be determined based on a role or organizational information (e.g., department) associated with the requestor, or on one or more keywords included in, for example, a title or description of the decision request.

At 435, a decision approval rule set is identified based on the classified request, the decision approval rule set identifying a set of approvers.

At 440, a determination is made as to whether one or more prior approvals are associated with the received request. For example, one or more prior approvals each made by an approver in the set of approvers can be identified. For example, prior approval information can be included in the decision request. As another example, prior approval information can be received from another system.

When no prior approvals are associated with the received request, approval requests are sent, at 445, to the current set of approvers. Each approval request can be a request, for example, to approve, reject, or modify the decision request.

When one or more prior approvals are associated with the received request, one or more approvers associated with one or more of the prior approvals are removed, at 450, from the set of approvers to update the current set of approvers. Removing the approver(s) associated with the prior approval(s) can prevent the approvers from receiving duplicate approval requests for the same decision request.

Approval requests are sent, at 445, to the updated set of approvers. Each approval request can be a request, for example, to approve, reject, or modify the decision request.

At 455, responses are received from the current set of approvers.

At 460, the received responses are stored as prior approvals associated with the current request ID.

At 465, an outcome of the requested decision is received. The outcome can be, for example, a response from a final approver. The outcome can be, for example, an approval, rejection, or partial approval of the requested decision.

At 470, a decision request response is returned to the requesting user. In some implementations, a second request for a decision is initiated at a second decision manager system in response to receiving the outcome of the requested decision. In such implementations, an outcome of the second request for a decision can be returned to the requesting user as the outcome of the requested decision.

Figure 5:
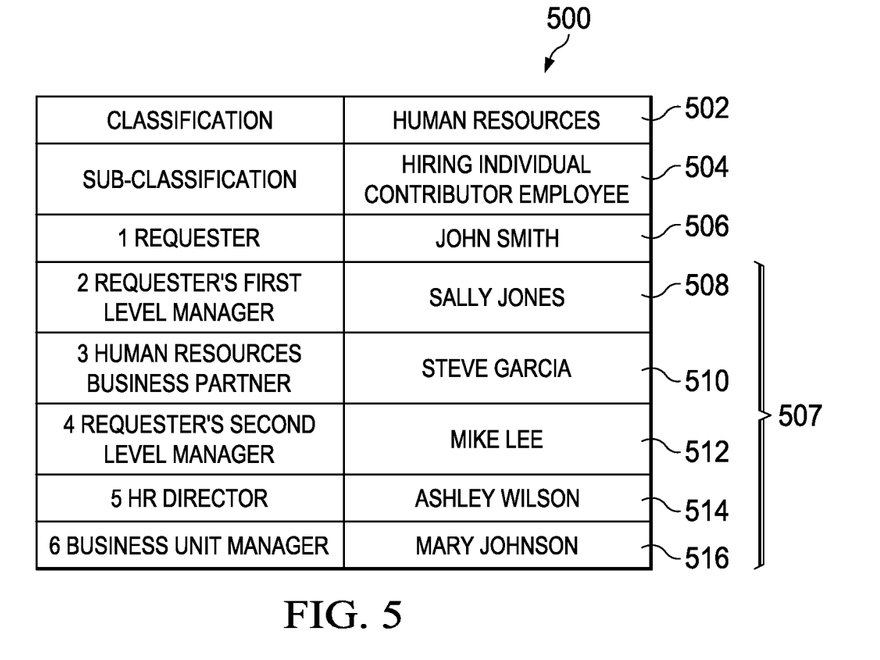
FIG. 5 illustrates example request information that is included in, determined for, or otherwise associated with, a request for a decision.

FIG. 5 illustrates example request information 500 that is included in, determined for, or otherwise associated with, a request for a decision. For example, the request information 500 includes a classification 502 of "human resources" and a sub-classification 504 of "hiring individual contributor employee". The classification 502 and the sub-classification 504 can be determined, for example, by a classification engine, such as based on metadata associated with the request. As another example, the request information 500 includes a name 506 of the requestor (e.g., "John Smith").

The request information 500 includes approver information 507 for a set of approvers associated with the request. As respectively indicated by individual approver information items 508, 510, 512, 514, and 516, the set of approvers includes the requestor's first level manager (e.g., "Sally Jones"), a human resources business partner (e.g., "Steve Garcia"), the requestor's second level manager (e.g., "Mike Lee"), a human resources director (e.g., "Ashley Wilson"), and a business unit manager (e.g., "Mary Johnson").

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method executed by one or more processors, the method comprising:
receiving a request for a decision at a decision manager system, the received request associated with a unique identifier;
classifying the request based on metadata associated with the received request;
identifying a decision approval rule set based on the classified request, the decision approval rule set identifying a set of approvers and a defined schedule associated with routing requests to the set of approvers;
identifying at least one prior approval associated with the unique identifier associated with the received request, the at least one identified prior approval associated with at least one approver among the identified set of approvers, wherein the at least one identified prior approval corresponds to at least one approval associated with a prior related request to the received request; and
reducing time and resources consumed in reaching the decision by applying the at least one prior approval to the decision associated with the received request and automatically updating, at the decision manager system, the set of approvers by automatically applying the at least one prior approval associated with the request in association with the corresponding at least one approver and removing the at least one approver from the set of approvers in the defined schedule associated with routing requests to the set of approvers before sending the request to any approver in the set of approvers; and
wherein the identified decision approval rule set defines at least one rule determining when a prior approval of at least one approver is no longer valid based on subsequent actions by at least one other approver in the set of approvers, the method further comprising, in response to determining that the prior approval of the at least one approver is determined to be no longer valid:
removing the at least one prior approval from being applied to the decision associated with the received request and automatically updating the set of approvers to include the at least one approver associated with the no longer valid prior approval and updating the defined schedule routing of requests to include the at least one approver associated with the no longer valid prior approval.

2. The method of claim 1 further comprising:
sending approval requests to the remaining updated set of approvers;
receiving responses from the updated set of approvers; and
storing the received responses as prior approvals associated with the unique identifier associated with the received request to be applied to future requests associated with the unique identifier.

3. The method of claim 2 wherein after responses from each of the set of approvers are received, an outcome of the requested decision is received.

4. The method of claim 3 wherein the request for the decision is a first request for the decision, and wherein the decision manager system is a first decision manager system, further comprising:
initiating a second request for a decision at a second decision manager system in response to receiving the outcome of the first requested decision.

5. The method of claim 4 wherein at least one prior approval from the first decision manager system is used as a prior approval in the second decision manager system.

6. The method of claim 5 wherein the second requested decision is associated with the unique identifier of the first requested decision.

7. The method of claim 1 wherein the request for the decision is associated with a decision deadline.

8. The method of claim 1 wherein classification is performed by a classification system, wherein the classification system comprises a learning system.

9. The method of claim 1 wherein the identified set of approvers is based on a requestor's first-level manager, the requestor's second-level manager, a human resources business partner, a human resources director, and a business unit manager.

10. The method of claim 3 wherein the decision approval rule set is modified based on the outcome of the requested decision, further comprising identifying the modified decision rule set for a future request for a decision having the same classification as the requested decision.

11. The method of claim 10 wherein modifying the decision approval rule set comprises modifying an ordering of the set of approvers.

12. A system comprising:
one or more computers associated with an enterprise portal; and
a non-transitory computer-readable medium coupled to the one or more computers having instructions stored thereon which, when executed by the one or more computers, cause the one or more computers to perform operations comprising:
receiving a request for a decision at a decision manager system, the received request associated with a unique identifier;
classifying the request based on metadata associated with the received request;
identifying a decision approval rule set based on the classified request, the decision approval rule set identifying a set of approvers and a defined schedule associated with routing requests to the set of approvers;
identifying at least one prior approval associated with the unique identifier associated with the received request, the at least one identified prior approval associated with at least one approver among the identified set of approvers, wherein the at least one identified prior approval corresponds to at least one approval associated with a prior related request to the received request; and
reducing time and resources consumed in reaching the decision by applying the at least one prior approval to the decision associated with the received request and automatically updating, at the decision manager system, the set of approvers by automatically applying the at least one prior approval associated with the request in association with the corresponding at least one approver and removing the at least one approver from the set of approvers in the defined schedule associated with routing requests to the set of approvers before sending the request to any approver in the set of approvers; and wherein the identified decision approval rule set defines at least one rule determining when a prior approval of at least one approver is no longer valid based on subsequent actions by at least one other approver in the set of approvers, the operations further comprising, in response to determining that the prior approval of the at least one approver is determined to be no longer valid:

removing the at least one prior approval from being applied to the decision associated with the received request and automatically updating the set of approvers to include the at least one approver associated with the no longer valid prior approval and updating the defined schedule routing of requests to include the at least one approver associated with the no longer valid prior approval.

13. The system of claim 12 wherein after responses from each of the set of approvers are received, an outcome of the requested decision is received.

14. The system of claim 13 wherein the request for the decision is a first request for the decision, and wherein the decision manager system is a first decision manager system, the operations further comprising:

initiating a second request for a decision at a second decision manager system in response to receiving the outcome of the first requested decision.

15. A computer program product encoded on a non-transitory storage medium, the product comprising non-transitory, computer readable instructions for causing one or more processors to perform operations comprising:

receiving a request for a decision at a decision manager system, the received request associated with a unique identifier;

classifying the request based on metadata associated with the received request;

identifying a decision approval rule set based on the classified request, the decision approval rule set identifying a set of approvers and a defined schedule associated with routing requests to the set of approvers;

identifying at least one prior approval associated with the unique identifier associated with the received request, the at least one identified prior approval associated with at least one approver among the identified set of approvers, wherein the at least one identified prior approval corresponds to at least one approval associated with a prior, related request to the received request; and reducing time and resources consumed in reaching the decision by applying the at least one prior approval to the decision associated with the received request and automatically updating, at the decision manager system, the set of approvers by automatically applying the at least one prior approval associated with the request in association with the corresponding at least one approver and removing the at least one approver from the set of approvers in the defined schedule associated with routing requests to the set of approvers before sending the request to any approver in the set of approvers; and wherein the identified decision approval rule set defines at least one rule determining when a prior approval of at least one approver is no longer valid based on subsequent actions by at least one other approver in the set of approvers, the operations further comprising, in response to determining that the prior approval of the at least one approver is determined to be no longer valid:

removing the at least one prior approval from being applied to the decision associated with the received request and automatically updating the set of approvers to include the at least one approver associated with the no longer valid prior approval and updating the defined schedule routing of requests to include the at least one approver associated with the no longer valid prior approval.

16. The product of claim 15 wherein after responses from each of the set of approvers are received, an outcome of the requested decision is received.

17. The product of claim 16 wherein the request for the decision is a first request for the decision, and wherein the decision manager system is a first decision manager system, the operations further comprising:

initiating a second request for a decision at a second decision manager system in response to receiving the outcome of the first requested decision.

18. The product of claim 17 wherein at least one prior approval from the first decision manager system is used as a prior approval in the second decision manager system.

19. The product of claim 16 wherein the decision approval rule set is modified based on the outcome of the requested decision, the operations further comprising identifying the modified decision rule set for a future request for a decision having the same classification as the requested decision.

* * * * *